(12) United States Patent
Lometillo et al.

(10) Patent No.: US 6,713,101 B2
(45) Date of Patent: Mar. 30, 2004

(54) FROZEN DESSERT NOVELTY AND METHOD FOR ITS PREPARATION

(75) Inventors: Josephine E. Lometillo, Hillard, OH (US); Singhachai Surintranspanot, Dublin, OH (US)

(73) Assignee: Nestec S.A., Vevey (CH)

( * ) Notice: Subject to any disclaimer, the term of this patent is extended or adjusted under 35 U.S.C. 154(b) by 273 days.

(21) Appl. No.: 09/846,989

(22) Filed: May 1, 2001

(65) Prior Publication Data

US 2002/0164403 A1 Nov. 7, 2002

(51) Int. Cl.[7] ............... A23G 3/00; A23G 9/00
(52) U.S. Cl. .......... 426/91; 426/100; 426/249; 426/68; 426/565; 426/576; 426/578
(58) Field of Search ............ 426/91, 100, 249, 426/68, 565, 576, 578

(56) References Cited

U.S. PATENT DOCUMENTS

| | | | |
|---|---|---|---|
| 2,747,525 A | | 5/1956 | Lund .................... 107/54 |
| 4,219,581 A | * | 8/1980 | Dea et al. .............. 426/565 |
| 5,493,866 A | * | 2/1996 | Hotaling ................. 62/66 |
| 6,187,365 B1 | * | 2/2001 | Vaghela et al. .......... 426/565 |
| 6,231,901 B1 | * | 5/2001 | Sharkasi et al. ......... 426/101 |
| 6,379,724 B1 | * | 4/2002 | Best et al. .............. 426/68 |
| 6,399,134 B1 | * | 6/2002 | Best et al. ............. 426/565 |
| 6,461,653 B1 | * | 10/2002 | Cox .................... 426/88 |
| 6,503,548 B1 | * | 1/2003 | Daniel et al. ........... 426/249 |

FOREIGN PATENT DOCUMENTS

| | | | |
|---|---|---|---|
| DE | 39 09 317 A1 | | 10/1990 |
| GB | 692701 | | 6/1953 |
| GB | 917344 | | 2/1963 |
| GB | 954113 | | 4/1964 |
| JP | 57155953 | | 9/1982 |
| WO | WO 93/21776 | * | 11/1993 |
| WO | WO 94/06305 | | 3/1994 |

* cited by examiner

Primary Examiner—N. Bhat
(74) Attorney, Agent, or Firm—Winston & Strawn LLP

(57) ABSTRACT

A frozen dessert novelty which is a water ice molded confection product that includes a thin translucent shell and a multi-colored core which is encased into the shell and which is visible in the product before and during consumption, and a process for preparing it. The product is mounted on a stick to facilitate handling and eating.

19 Claims, 2 Drawing Sheets

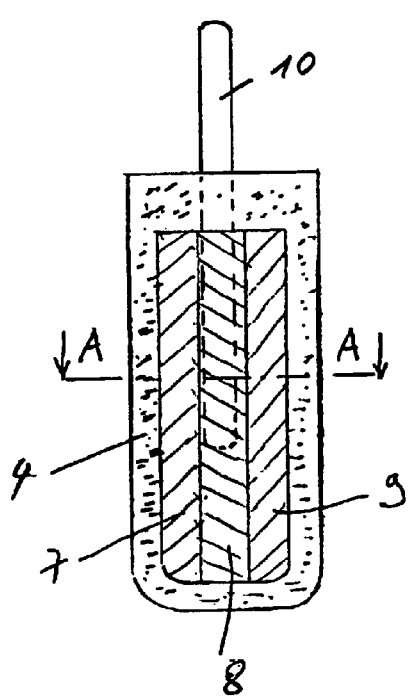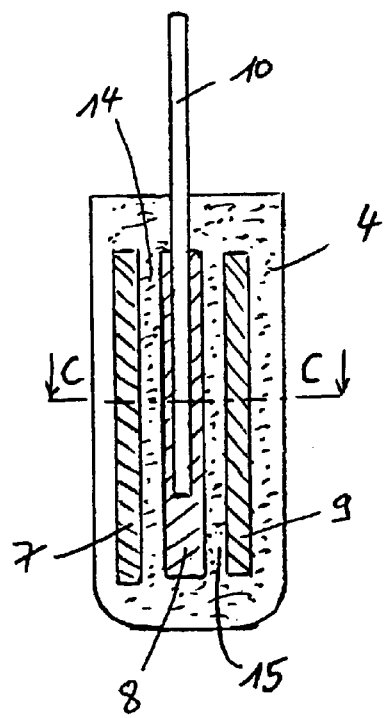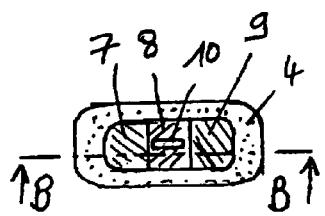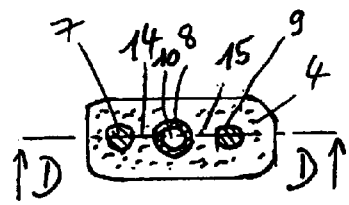

FROZEN DESSERT NOVELTY AND METHOD FOR ITS PREPARATION

FIELD OF THE INVENTION

The invention relates to a frozen dessert novelty which consists of a water ice bar having a semi-transparent or translucent appearance with visible multicolored core design.

BACKGROUND

Typical water ice novelty products come in a variety of shapes with a range of colors and flavors. These products usually are in the form of a molded bar on a stick and typically include a water ice product or a combination of water ice with ice cream and ice-cream related products. In order to be more attractive to consumers, it is often presented in decorative shapes such as stick bars with stripes or stripe coatings representing various patterns or in a marbled appearance.

Other colored iced products are known in the art. U.S. Pat. No. 5,958,481 concerns a method of making novelty ice cubes that change color when placed into a drink, by forming a clear water ice cube from pure water and covering it with a colored outside frozen thin layer of separately frozen water mix containing acid and food dye, so as to obtain a colored layer encasement that completely encases the clear ice cube. When final ice cube is placed into a drink, it causes the layer encasement to melt and leave a clear water ice cube while the color dilutes in the drink and the acid decolors the drink solution, thus producing a magic effect.

U.S. Pat. No. 3,971,853 is related to a frozen confection which is comprised of a plurality of ingredients of individual colors appearing in a manner so that the colors are readily identifiable in some areas and intermingled in other areas to make a plurality of colors different from the original colors both on the surface and in the interior of the confection, thus producing an appearance of random coloring of the confection. The method for making the frozen confection includes conveying two substantially frozen ingredients to a nozzle, introducing a third ingredient which is substantially liquid, and discharging all ingredients into a mold such that the ingredients tend to move laterally within the mold to facilitate greater distribution of additional ingredients which permute the ingredients already in the mold and then freezing the whole.

U.S. Pat. Nos. 4,986,080, 5,343,710 and 5,582,856 concern frozen water ice confections having a plurality of differently flavored or colored sections, particularly with visible color stripes or spirals or any other shape, methods and apparatuses for making them. The manufacturing processes, using the so called "product-in-product" technology require two separate series of moulds to make the first fill for the center and the second fill as the outside design. The decorating stripes, spirals or shapes are positioned on the outside of the product.

The traditional technology to preparing a water-based frozen stick novelty is to freeze and solidify an aqueous mixture, with or without added flavor and color, either singly, i.e. one component, or as a combination, e.g. a shell and core product. Such shell and core product can be a combination of two different water ice base recipes or a combination water ice/sherbet, water ice, ice cream. The freezing process involves the use of a metal container of any specific shape as a mold that is kept frozen in a refrigerant solution, i.e. brine or liquid cryogen or in any other cold environment like a refrigerated gas. A homogeneous mix with or without the addition of fruit pieces, can be flavored or colored as desired, is quiescently frozen in the metal container which is kept submerged in or subjected to a cold medium.

For conventional shell and core products, the process involves the following steps:
- back-suction of the still liquid core of the primary cold mix thus forming the shell,
- the subsequent addition of a secondary mix inside the formed shell,
- allowing the mix to partially freeze,
- insertion of a stick that is composed of wooden or plastic material, and
- the extraction of the completely frozen product out of the defrosted container.

SUMMARY OF THE INVENTION

The invention now provides a frozen confectionery novelty in the fun category which appeals particularly to children and young adults in that is offers a unique and attractive appearance.

The invention thus relates to a water ice molded stick bar which comprises a thin translucent shell and a multi-colored core which is encased into the shell and which is visible in the product before and during consumption.

The invention further relates to methods for the preparation of such a product.

DETAILED DESCRIPTION OF THE INVENTION

The shell component of the invention has a translucency, as opposed to transparency. Transparency is the property of transmitting light without appreciable scattering so that bodies lying beyond are seen clearly. In the present case, translucency of the shell allows the consumer to see the general shape and color components of the core. Advantageously, the core components are composed of bright and preferably contrasted adjacent colored zones with a sharp interface separating the zones.

The shell component or mix preferably is composed of water in an amount of preferably from about 60 to 90% by weight. A sweetener is present in an amount of between about 10 to 35% by weight. This sweetener may be sucrose, glucose or a combination of sucrose and glucose, with the sucrose representing preferably from about 15 to 25% by weight and glucose preferably from about 2 to 5% by weight. Stabilizers may be included at a level of preferably from about 0.05 to 1% by weight and a salt of a divalent cation, preferably calcium chloride, may be present at a level of from about 0.1 to 1% by weight.

The sweeteners are added not just for sweetness but also to boost the solids level and to enhance the product's flavor attribute. Any stabilizer can be used with gums being advantageous. Preferably, the stabilizer is a hydrocolloid blend of locust bean gum and guar gum. The preferred salt, calcium chloride, is used at a low level as a source of calcium ions and serves to react with the colored core hydrocolloid gelling component (as it will be indicated hereinafter) to give wall rigidity between the shell and the core phases. In this way, there cannot be any substantial interpenetration of strong colored phase into the shell.

A food grade acid may be added to give the tartness and enhanced flavor release. This acid is preferably added at a level of about 0.05 to 2% by weight. Fruit flavors, such as berry or other fruits, are preferably added to the pasteurized, homogenized and aged cold mix, preferably at a level of from about 2 to 15% by weight.

The core component or mix is also composed of water, preferably from about 60 to 85% by weight. A sweetener is typically used in an amount of between about 10 to 40% by weight. The sweetener preferably is sucrose, glucose or a sucrose and glucose combination, with the sucrose representing from about 10 to 20% by weight and glucose present from about 5 to 15% by weight. The sweeteners are added not just to boost the solids level but also to give flavor and sweetness attribute.

A food grade acid preferably is added to give the tartness and enhanced flavor release, preferably at a level of about 0.05 to 2% by weight. Again, fruit flavors such as berry or other fruits are preferably added to the pasteurized, homogenized and aged cold mix, preferably at a level of from about 2 to 15% by weight.

A stabilizer gum may also be added. Preferably, this includes a component which is able to react with a divalent cation, e.g. calcium to form a gel. Preferably, the stabilizer gum used is a mixture of a hydrocolloid blend of pectin, preferably at a level of from about 0.1 to 3% by weight and guar gum, preferably at a level of from about 0.1 to 1.5% by weight. Pectin is a high molecular weight carbohydrate that basically consists of a chain of galacturonic acid units which are linked by alpha-1,4 glucosidic bonds. The galacturonic acid chain is partially esterified as methyl esters. The commercial pectins are classified into two major groups, high ester (HE) and low ester (LE). This division is related to the number of ester groups in the pectin molecule which act as the functional groups.

LE pectin preferably is used in the product of the invention. It has less than 50% methyl group substitution, i.e., a low level of ester groups and thus the calcium cross-links between the number of carboxyl groups is significant for the formation of the resulting gel. The pectin chains are negatively charged; a number of positive divalent ions can bridge pectin molecules and calcium is particularly effective at forming complexes with LE pectin. Junction zone(s) is(are) formed with calcium in the interface between the shell and the core, hence giving the rigidity needed to hold the different phases together.

Guar gum preferably is used as a viscosity modifier for enhanced stand up property, and as texture, body and heat shock resistance enhancers.

In a first embodiment, the method of manufacturing the ice confection of the invention comprises:
   filling a mould with a primary mix for the shell component,
   after a short partial freezing, removing liquid from the center of the partially frozen shell by sucking to create a translucent, frozen shell portion having a thickness of about 0.1 to 8 mm,
   introducing a mould insert with open slots centered into the mould containing the frozen shell, which constitutes divided cavities for secondary mixes of different colors,
   pouring secondary mixes of different colors and flavors in the open slots of the insert to fill the cavities and to form layers of the core component,
   retracting immediately the mould inserts,
   additioning an aliquot of primary infix on top of the core component to cap it off,
   inserting a stick,
   freezing the whole confection, and
   extracting the completely frozen product from the mould.

To create the distinct vertical separate colored stripes, the mould inserts can be of different types. They can consist of hollow rod-shaped inserts or of partition divider inserts, preferably of metal, most preferably of stainless steel. Other material types—plastic (e.g. such as Delrin TM) or rubber composite can be used. In the case of partition dividers, using a single plan divider will produce a two color/flavor combination. Using two essentially parallel plan dividers will result in a three-color/flavor combination. Multiple adjacently placed dividers can be used to achieve any desired number of colors/flavors and shapes combination, depending on the shape of the interface between the different blocks of colored and flavored mixes, e.g. when using dividers of curved, spiral-shaped, star-shaped, cross-shaped, lozange-shaped or triangle-shaped surface. While there is no limit to the number of stripes that can be provided, it is preferred to have between 2 and 10 stripes.

In a second embodiment, the method of the invention comprises:
   filling a mould with a primary ice confection mix,
   introducing a mould insert into the mould containing the primary mix,
   keeping the mould insert in place until the primary mix is completely frozen,
   retracting the mould insert and so constituting cavities for secondary mixes of different colors and flavors,
   pouring secondary mixes of different colors and flavors in the cavities to form a variety of core components,
   additioning an aliquot of primary mix on top of the core component to cap it off,
   inserting a stick,
   freezing the whole confection, and
   extracting the completely frozen product from the moulds.

The mould inserts consist of individual rod attachments, two or three or more depending on the desired end use, of metal. The rods may have either hollow insides of the thin walled lining or contain electrical wire probes, filled with a liquid or gelled conductor material and capped off at the end. The wires can heat the metal to assist in its removal.

In the former case, hot water or air is introduced into the empty metal cavity. In both cases the metal walls warm up thereby inducing the partial melting of the frozen primary mix that is directly in contact with the metal rod. The mould insert can then be easily retracted from the mould containing the primary frozen mix.

The resulting formed hollow cavities are thus ready to be filled with the secondary colored and flavored mixes.

In the latter case, the electric cartridge wire heaters are electrically activated. The gel conductor material functions to evenly distribute the heat through the metal surface and eliminates hot points. This causes the metal walls to warm up thereby inducing the partial melting of the frozen primary mix that is directly in contact with the metal rod. The mould insert can then be easily retracted from the mould containing the primary frozen mix. The resulting formed hollow cavities are thus ready to be filled with the secondary colored and flavored mixes.

For example, the cavities can be essentially cylindrical in shape or representing slightly conical cylinders and parallel. They can be filled with flavored and bright colored mixes, e.g., yellow, red and blue; green, purple and orange, etc.

The white and translucent shell formed during the freezing step is about 0.1 to 8 mm thick near the outside surface and preferably about 1.5 to 2 mm thick.

Minimal introduction of air or overrun into the shell mix in combination with the minimal wall thickness of the shell creates the translucent appearance and in practice translucency level can be customized by addition of an overrun of between about 1 to 50%.

The food grade acid is added to give the tartness and enhanced flavor release. Additional flavors such as berry or other fruits are added to the pasteurized, homogenized, cooled and aged cold secondary mix used for the core portion. Aliquots of the secondary mix are separately colored and flavored. Different water-soluble, preferably bright colors, e.g. red, yellow or blue; green, purple and orange, etc. can be used.

The different colored and flavored mixes can be either frozen colder using conventional freezer with overrun, preferably up to 50% by volume or without overrun (as slushes), and then filled into the cavities under pressure at negative temperature, e.g. using extrusion, or filled liquid at positive temperature, preferably of from 0 to about 8° C. into the cavities of the formed thin white or translucent shell. The product is allowed to freeze completely and is then extracted from the heated mould.

In an alternative embodiment of forming the shell, the core of the multi-colored appearance can be first created in a mold, demolded and the shell is made at the end of the process by dipping the core into a bath containing the water mix of the translucent shell (as a coating).

Preferably, the molded bar on a stick is water-dipped prior to packaging. This aids not only to give the frozen bar additional coating protection for better handling and heat shock resistance but also gives a shiny appearance to the final product. In an alternative to the final water dipping, a thin water spray can be applied on the inside wall of the empty cold mold at the beginning to create the protective, very thin water shell.

In the preceding description, the core component consists of vertical colored blocks. Instead of vertical blocks, the core could be composed of successively filled layers of different contrasting colors and flavors building horizontal layers which are visible through the translucent shell without departing from the scope and spirit of the invention.

BRIEF DESCRIPTION OF THE DRAWINGS

The invention is now described in conjunction with the following drawings that illustrate preferred embodiments wherein.

EXAMPLES

The invention is further illustrated by reference to the following Examples describing in detail the products and methods of the present invention. The Examples are representative and should not be construed to limit the scope of the invention in any way. In the following Examples, parts and percentages are by weight unless stated otherwise.

Example 1

Figure 3:
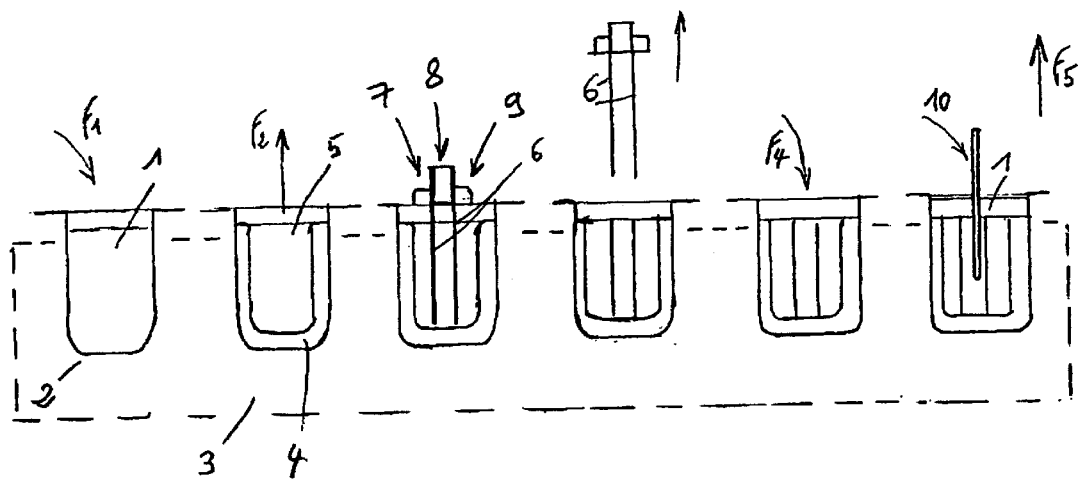
FIG. 3 is a schematic view of the process for making the product of FIG. 1.
Figure 1:
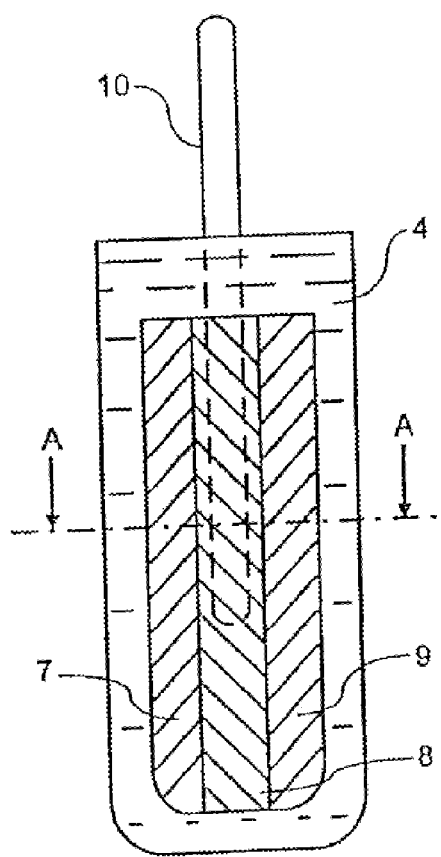
FIG. 1 shows a longitudinal cross-section along line BB in FIG. 2, of a first embodiment of a product of the invention.
Figure 2:
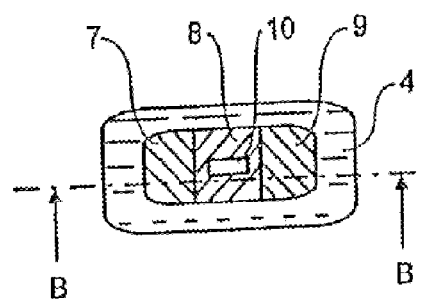
FIG. 2 is a transversal cross-section of the product of FIG. 1, along line AA in FIG. 1.

This Example describes a first embodiment of a composite product of the invention illustrated in FIGS. 1 and 2, using a first method of preparation and which is illustrated in FIG. 3.

1) Preparation of Primary White Base Mix as Component of the Shell

A water ice first mix was prepared containing 19.6% sucrose, 3.75% dextrose, 0.26% stabilizer blend which is a mixture of locust bean gum and guar gum, the mix was pasteurized, homogenized, cooled, 0.15% calcium chloride and flavor were added, and was adjusted to pH 3–5 (the pH range is dependent on the desired tartness and flavor profile for final product) with food grade acid, the rest being water and aged.

2) Preparation of Secondary Mix as Component of the Composite Colored Core

A water ice second mix was prepared containing 13.5% sucrose, 8.29% dextrose, stabilizer blend consisting of 0.5% pectin (which is reactive to calcium) and 0.3% guar gum, the mix was pasteurized, homogenized, cooled, 5% flavor was added, and was adjusted to pH 3–5 (the pH range is dependent on the desired tartness and flavor profile for final product) with food grade acid, the rest being water and aged.

Three aliquots of the secondary mix were colored respectively in red (red cabbage extract), yellow (tumeric yellow) and blue (brillant blue FCF) with water soluble edible colorants. Other contrasting colors may be used.

3) Preparation of Composite Water Ice Stick Bar (FIG. 3)

The primary white mix 1 was filled (arrow f1) in liquid form at positive temperature in a mould 2 and was partly frozen in the mould in a brine bath 3. After formation of a shell 4 at the mould interior surface, the unfrozen liquid center was sucked out (arrow f2) and the thus formed center cavity 5 of the ice shell 4 was hardened with liquid nitrogen. While the mould 2 remained in the brine bath 3, stainless steel insert 6 with two dividers was inserted in the cavity 5, the said center cavity was then filled with the three secondary mixes 7, 8 and 9 in liquid form at positive temperature through the open slots in the insert 6, the insert 6 was quickly retracted (arrow f3), additional primary mix 1 was poured to cap off (arrow f4), a stick 10 was inserted and the whole was frozen, and after warming the external surface of mould 2, the whole frozen composite bar was demoulded (arrow f5). The molded stick bar was water-dipped to give a protective glaze and shiny appearance and packaged (not shown).

As an alternative to create the protective water glaze (not represented), a thin water spray was applied on the inside wall of the cold empty mould 2 as a first step, the following steps being as represented in FIG. 3.

As an alternative to first forming a shell by the shell and core method, in an alternative embodiment of forming the shell (not shown), the core of the multi colored appearance was first created in the mould, demolded and the shell was made at the end of the process by dipping the core into a bath containing the water mix of the translucent shell (as a coating).

The resulting water ice stick bar is illustrated in FIG. 1 and 2. It has a tanslucid external shell 4 and three visible vertical blocks of red 7, yellow 8 and blue 9 water ice joined side by side as center.

Example 2

A similar procedure to that of Example 1 was followed except that two secondary mixes, respectively yellow and blue were frozen on a batch freezer and filled at negative temperature under pressure from pressurised hoppers in two vertical layers in the mould and shell cavity which contained a single divider as insert.

The resulting water ice stick bar has a tanslucid external shell and two visible vertical blocks of yellow and blue water ice joined side by side as center.

Example 3

Figure 6:
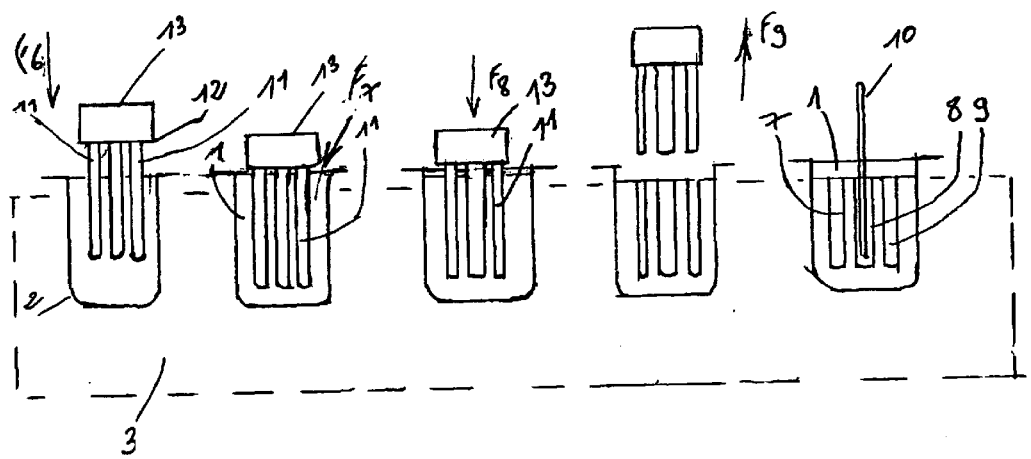
FIG. 6 is a schematic view of the process for making the product of FIG. 4.

A similar procedure to that of Example 1 was followed except that an alternative method illustrated in FIG. 6 was used to create the cavities. Thus, thin-walled hollow stainless steel insert rods 11, which were closed at their bottom, open at their top and integral with a bottom plate 12 of a rectangular container 13, which 30 container 13 and rods 11 were positioned over a series of moulds 2 so that the rods were introduced into the moulds 2 (arrow f6).

White primary mix 1 was filled in the free space in the mould (arrow f7) and frozen while the rods were kept in place, hot water was poured into the container 13 and hollow rods 11 (arrow f8) for warming up the rod walls which could then be easily retracted (arrow M), thus creating three parallel cylindrical cavities in the frozen mass of the primary mix 1. The cavities were then filled with the three secondary mixes 7, 8 and 9 and all the remaining operations comprising capping off with additional mix 1, stick insertion, surface warming of the mould, demolding and glazing were as in Example 1. As an alternative to create the protective water glaze (not represented), a thin water spray was applied on the inside wall of the cold empty mould 2 as a first step, the following steps being as represented in FIG. 6.

Figure 4:
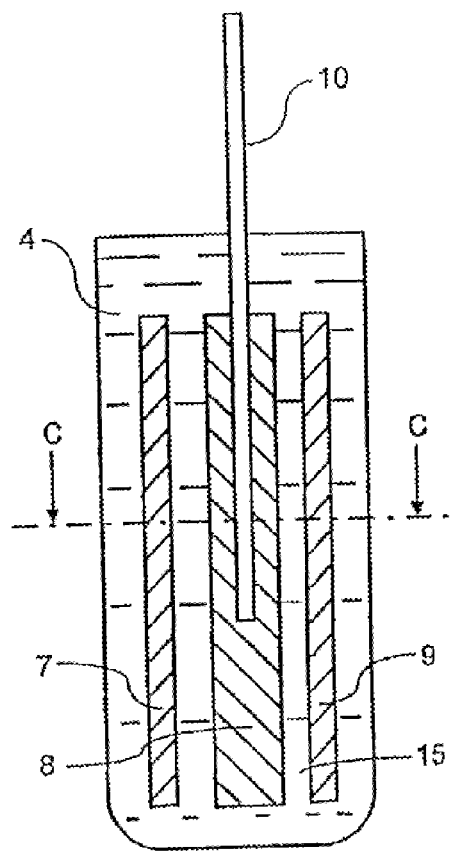
FIG. 4 shows a longitudinal cross-section along line DD in FIG. 5, of a second embodiment of a product of the invention.
Figure 5:
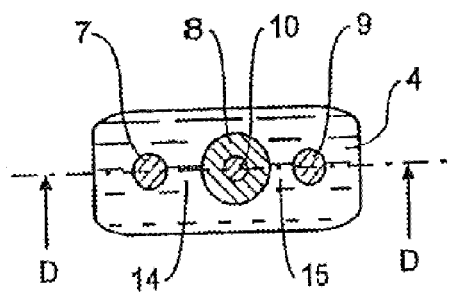
FIG. 5 is a transversal cross-section of the product of FIG. 4, along line CC in FIG. 4
Figure 3:
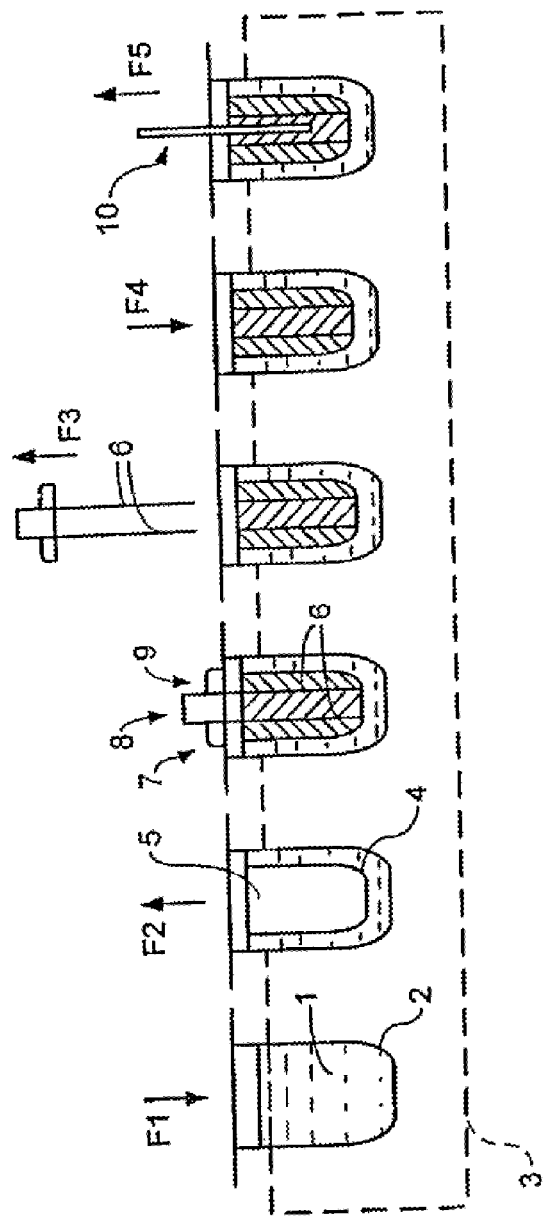
Figure 6:
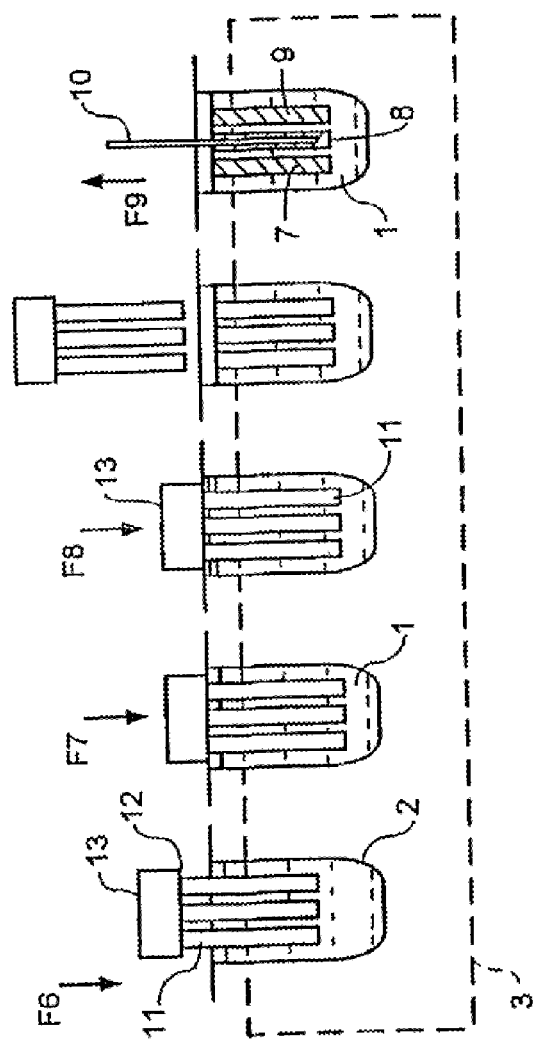

The resulting water ice stick bar is illustrated in FIG. 4 and 5. It has a translucent external shell 4 and three visible separate vertical cylindrical blocks of red 7, yellow 8 and blue 9 water ice as centers, with translucent zones 14 and 15 between the colored vertical blocks.

Example 4

A similar procedure to that of Example 3 was followed except that an alternative method was used to create the cavities. Instead of using thin-walled hollow stainless steel insert rods filled with hot water, similar rods connected to electric cartridge wire heaters were electrically activated. This caused the metal walls of the rods to warm up thereby inducing the partial melting of the frozen primary mix directly in contact with the metal rods. The mould insert could then be easily retracted from the mould containing the primary frozen mix. The resulting formed hollow cavities were thus ready to be filled with the secondary colored and flavored mixes and all the remaining operations comprising capping off with additional mix 1, stick insertion, surface warming of the mould, demolding and glazing were as in Example 1.

The resulting water ice stick bar is illustrated in FIG. 4 and 5. It has a translucent external shell 4 and three visible separate vertical cylindrical blocks of red 7, yellow 8 and blue 9 water ice as centers with translucent zones 14 and 15 between the colored vertical blocks.

What is claimed is:

1. A water ice molded product which comprises a translucent water-ice shell, a multi-colored core provided within the shell which core is visible in the product before and during consumption, and a stick for holding the product, in which the shell component is composed of water in an amount of about 60 to 90% by weight, a sweetener in an amount of between about 10 and 35% by weight, a stabilizer in an amount of about 0.05 to 1% by weight, and a salt in an amount of about 0.1 to 1% by weight.

2. The water ice molded product according to claim 1, in which the sweetener of the shell is sucrose, glucose or a combination of sucrose and glucose, the salt is a salt of a divalent cation, and the stabilizer is a gum or mixture of gums.

3. The water ice molded product according to claim 2, in which the sweetener of the shell is a combination of sucrose and glucose and the salt is calcium chloride.

4. The water ice molded product according to claim 3, wherein the sucrose is present in an amount of about 15 to 25% by weight and the glucose is present in an amount of about 2 to 5% by weight.

5. The water ice molded product according to claim 1, in which the stabilizer is a hydrocolloid blend of locust bean gum and guar gum and the blend is present in an amount of from about 0.05 to 1% by weight and further comprising a food grade acid in an amount sufficient to provide tartness and enhanced flavor release.

6. The water ice molded product according to claim 1, wherein the translucency of the shell allows a consumer to see the general shape and color components of the core, and the core component is composed of a plurality of bright colored zones.

7. The water ice molded product according to claim 6, wherein the core components are contrasted adjacent colored zones with a sharp interface separating the zones.

8. The water ice molded product according to claim 1, in which the core component is composed of water in an amount of about 60 to 85% by weight, a sweetener is present in an amount of between about 10 to 40% by weight, and a divalent cation, and a stabilizer gum in amounts which are reactable to form a gel.

9. The water ice molded product according to claim 8, in which the sweetener in the core component is sucrose, glucose or a combination of sucrose and glucose, the cation is calcium chloride, and the stabilizer gum used is a mixture of a hydrocolloid blend of pectin at a level of from about 0.1 to 3% by weight and guar gum at a level of from about 0.1 to 1.5% by weight.

10. The water ice molded product according to claim 9, in which the sweetener in the core component is a combination of sucrose and glucose, with sucrose present in an amount of about 10 to 20% by weight and glucose present in an amount of about 5 to 15% by weight and a food grade acid is added in an amount sufficient to provide tartness and enhanced flavor release.

11. The water ice molded product according to claim 8, in which the salt of divalent cation in the shell component is used at an effective amount to react with a hydrocolloid gelling component of the colored core to give wall rigidity between the shell and the core phases and so to avoid any substantial interpenetration of colored phase into the shell.

12. The water ice molded product according to claim 11, in which the stabilizer gum used in the core component is a hydrocolloid blend of pectin.

13. A water ice molded product which comprises a translucent water-ice shell, a multi-colored core provided within the shell which core is visible in the product before and during consumption, and a stick for holding the product, in which the core component is composed of water in an amount of about 60 to 85% by weight, a sweetener is present in an amount of between about 10 to 40% by weight, and a divalent cation, and a stabilizer gum in amounts which are reactable to form a gel.

14. The water ice molded product according to claim 13, in which the sweetener in the core component is sucrose, glucose or a combination of sucrose and glucose, the cation is calcium chloride, and the stabilizer gum used is a mixture of a hydrocolloid blend of pectin at a level of from about 0.1 to 3% by weight and guar gum at a level of from about 0.1 to 1.5% by weight.

15. The water ice molded product according to claim 14, in which the sweetener in the core component is a combination of sucrose and glucose, with sucrose present in an amount of about 10 to 20% by weight and glucose present in an amount of about 5 to 15% by weight and a food grade acid is added in an amount sufficient to provide tartness and enhanced flavor release.

16. The water ice molded product according to claim 13, in which the salt of divalent cation in the shell component is used at an effective amount to react with a hydrocolloid gelling component of the colored core to give wall rigidity between the shell and the core phases and so to avoid any substantial interpenetration of colored phase into the shell.

17. The water ice molded product according to claim 16, in which the stabilizer gum used in the core component is a hydrocolloid blend of pectin.

18. The water ice molded product according to claim 16, in which the salt of divalent cation in the shell component is present at a level of from 0.1 to 1% by weight.

19. The water ice molded product according to claim 17, in which the hydrocolloid blend of pectin is present at a level of from 0.1 to 3% by weight and the guar gum is present at a level of from 0.1 to 1.5% by weight.

* * * * *

UNITED STATES PATENT AND TRADEMARK OFFICE
CERTIFICATE OF CORRECTION

PATENT NO.        : 6,713,101 B2
APPLICATION NO.   : 09/846989
DATED             : March 30, 2004
INVENTOR(S)       : Lometillo et al.

It is certified that error appears in the above-identified patent and that said Letters Patent is hereby corrected as shown below:

Title Page:
Item [75] Inventors, change "Singhachai Surintranspanot, Dublin, OH (US)" to
-- Singhachai Surintrspanont, Bangkok (TH) --.

Replace Figs. 1-6 with the following figures:

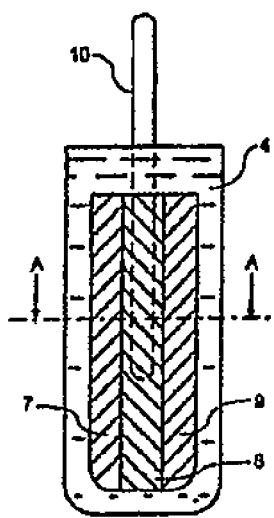

FIG. 1

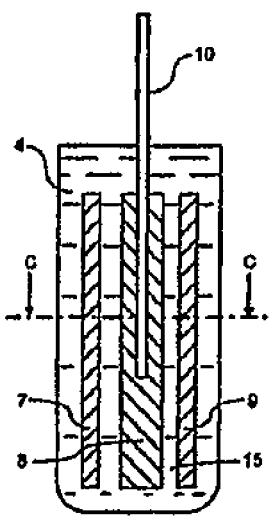

FIG. 4

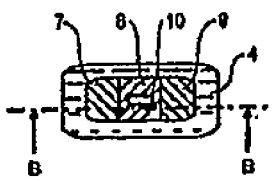

FIG. 2

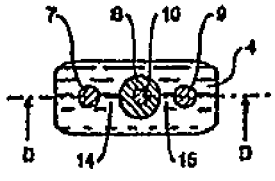

FIG. 5

UNITED STATES PATENT AND TRADEMARK OFFICE
CERTIFICATE OF CORRECTION

PATENT NO. : 6,713,101 B2
APPLICATION NO. : 09/846989
DATED : March 30, 2004
INVENTOR(S) : Lometillo et al.

It is certified that error appears in the above-identified patent and that said Letters Patent is hereby corrected as shown below:

Replace Figs. 1-6 with the following figures: (cont'd)
2/2

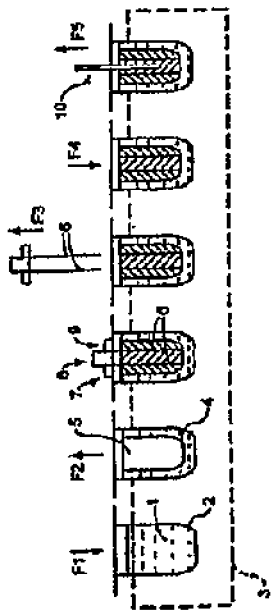

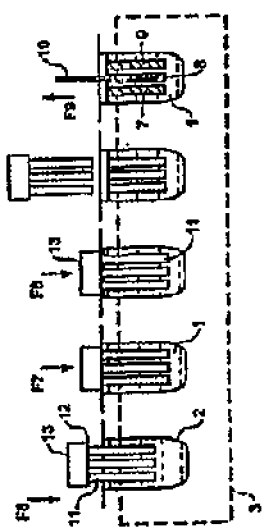

--

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,713,101 B2 | Page 1 of 3 |
| APPLICATION NO. | : 09/846989 | |
| DATED | : March 30, 2004 | |
| INVENTOR(S) | : Lometillo et al. | |

It is certified that error appears in the above-identified patent and that said Letters Patent is hereby corrected as shown below:

Delete Drawing Sheets 1 and 2 and substitute therefore the attached Drawing Sheets 1 and 2.

This certificate supersedes the Certificate of Correction issued April 17, 2007.

Signed and Sealed this

Twenty-second Day of July, 2008

JON W. DUDAS
*Director of the United States Patent and Trademark Office*